(12) United States Patent
Fujita et al.

(10) Patent No.: US 7,239,736 B2
(45) Date of Patent: Jul. 3, 2007

(54) METHOD OF WELDING THREE-DIMENSIONAL STRUCTURE AND APPARATUS FOR USE IN SUCH METHOD

(75) Inventors: Ken Fujita, Takasago (JP); Toshihiko Tsunatani, Takasago (JP); Tomoaki Kitagawa, Takasago (JP); Masahiko Mega, Takasago (JP); Yasushi Takeuchi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 658 days.

(21) Appl. No.: 10/302,934

(22) Filed: Nov. 25, 2002

(65) Prior Publication Data

US 2003/0108234 A1 Jun. 12, 2003

(30) Foreign Application Priority Data

Nov. 26, 2001 (JP) ............................. 2001-359985

(51) Int. Cl.
*G06K 9/00* (2006.01)
(52) U.S. Cl. ..................................... 382/141
(58) Field of Classification Search ................. 382/141
See application file for complete search history.

(56) References Cited

U.S. PATENT DOCUMENTS 4,547,800 A * 10/1985 Masaki ..................... 348/95
4,831,316 A * 5/1989 Ishiguro et al. ............. 700/254
5,572,102 A 11/1996 Goodfellow et al.
6,153,853 A 11/2000 Maruyama et al.

FOREIGN PATENT DOCUMENTS

| EP | 0 812 662 A1 | 12/1997 |
| GB | 0 152 594 A2 | 8/1985 |
| JP | 2000-263272 | 9/2000 |
| JP | 2000263272 | * 9/2000 |

* cited by examiner

*Primary Examiner*—Bhavesh M Mehta
*Assistant Examiner*—Damon M Conover
(74) *Attorney, Agent, or Firm*—Oblon, Spivak, McClelland, Maier & Neustadt, P.C.

(57) ABSTRACT

When a three-dimensional structure is formed by welding a plurality of members, accurate welding can be performed matching the three-dimensional shape. The teaching data consisting of the three-dimensional position at each of the welding points determined on each of the welding lines at a predetermined spacing on the basis of the design data of the three-dimensional structure is stored in a memory 18. A laser slit light sensor (a laser slit light emitting section 12 and a CD camera 13) is controlled by a total controller 17 via a camera controller 14 to photograph the welding point in order to obtain the image data of the welding point. An image processing apparatus 16 processes the image data to determine the amount of deviation from the design data of welding points. The total controller modify the teaching data on the basis of the amount of deviation from the design data of welding points to establish the modified teaching data and controls a welding head so that it moves according to the modified teaching data.

6 Claims, 5 Drawing Sheets

METHOD OF WELDING THREE-DIMENSIONAL STRUCTURE AND APPARATUS FOR USE IN SUCH METHOD

BACKGROUND OF THE INVENTION

1. Field of the Invention

The present invention relates to a method of welding a plurality of members to manufacture a three-dimensional structure and an apparatus for use in such a method when a plurality of members are connected to be formed into a three-dimensional structure.

2. Description of the Related Art

Generally, for manufacturing a three-dimensional structure(for example, a tail tube of a gas turbine combustor), a plurality of members are connected with each other by welding to form a three-dimensional structure. They are welded by gas shielded arc welding using shield gas(TIG welding, MAG welding, MIG welding, electro-gas arc welding), plasma welding, and laser beam welding, etc.

By the way, when connecting a plurality of members by TIG welding, generally the welding has been carried out by hand. In the case of hand welding, the quality of the welded part is various depending on the skill of the worker, since the location, width etc. of the welding position is different according to the line of welding(welding line). As a result, the quality of the welded structure is unstable.

For this reason, the welding by the use of carbon dioxide ($CO_2$) laser welding has been adopted in which the position to be welded is indicated by irradiating the position by a laser spot light and welding is done taking the laser spot light as a guide.

However, when the method of welding the position indicated by the laser spot light as described above is applied for welding a plurality of members to form a three-dimensional structure, there may occur the case the laser spot light deviate from the position to be welded depending on the position of the laser light emission and the irradiated position. For this reason, when welding was carried out on the position irradiated by the laser spot light, faulty welding such as the deviation from the weld line to be welded occurred in many cases, resulting in the necessity of repairing faulty weld.

Particularly, at the production of a three-dimensional structure by combining a plurality of members, plastically deformed member themselves may be deviated a little from the design drawing(designated shape). Faulty welding tends to occur inevitably when such members are combined and welded even when welding position is irradiated by a laser spot light, for the laser spot light may often deviate from the position to be welded.

To eliminate the disadvantage like this, a teaching method in YAG laser beam machine is disclosed in Japanese Patent Application Publication No. 2000-263272, in which the teaching is executed beforehand three-dimensional laser machining is carried out by irradiating the work with the YAG laser light which is emitted from a laser oscillator, transmitted via a fiber-optic cable, and radiated onto the work through the light-gathering lens provided in the laser machining head, characterized in that, the positions in the direction of height of a plurality of teaching points on the work are detected by the height detector provided in the laser machining head, a light for measurement emitted from a light source head which is provided outside the laser machining head and is set beforehand to pass the focussed position of the YAG laser light, irradiates the plurality of teaching points one after another, each reflected light from the work is photographed by a photographing means to represent on a display, the focussed position of the YAG laser light is detected by moving the coordinates of the reflected image on the display back-and-forth and side-to-side to allow the image coincide with the focussed position of the YAG laser light, a master job is produced by automatically storing the three-dimension data consisting of the position in back-and-forth and side-to-side direction and the height position of each of the teaching points by an image processing apparatus, and for ordinary job a corrected job for each work is produced by automatic analysis and correction of said master job at the same points as those of said master job on the basis of the three-dimension data of the plurality of the teaching points of said master job in said processing apparatus as necessary.

According to the invention, the three-dimension data consisting of back-and-forth and side-to-side position and height position is determined automatically for each of the plurality of teaching points by the image processing apparatus, analyzed, checked, and corrected to be reflected in the program, so that teaching accuracy is improved, stable laser machining is performed, and further when the work is changed, the check and correction are automatically executed by the image processing apparatus. Therefore, the checking and correcting process of the teaching points by the worker when the work is changed is eliminated, which eliminates the needs for workers burden and time, resulting in stable small lot production of three-dimensional structure without using jigs of high accuracy and highly accurate component members.

However, in the prior art like this, operation is needed for making the light image coincide with the focussed position of the YAG laser light by moving the light image back-and-forth and side-to-side on the display after the height position of each of the plurality of teaching points is detected in order to obtain the three-dimension data consisting of back-and-forth and side-to-side position and height position. Therefore that teaching operation becomes complicated.

SUMMARY OF THE INVENTION

The object of the present invention is to provide a method of welding a three-dimensional structure and an apparatus for use in such a method used when manufacturing a three-dimensional structure by welding a plurality of members, by which automatic welding matching to the three-dimensional shape can be performed with simple operation.

According to the present invention, a method of welding a three-dimensional structure used when forming the three-dimensional structure by combining and connecting a plurality of members by welding along welding lines, wherein the method has a first step in which three-dimensional positions(coordinates) of welding points are determined on each of said welding lines at a predetermined spacing on the basis of the design data of said three-dimensional structure, the teaching data consisting of the three-dimensional positions of said welding points and the normal vectors at the points is established, and the amount of deviation of position from design data at each welding point from the design data is determined from the image obtained by photographing each welding line at each welding point according to said teaching data; a second step in which modified teaching data corrected based on said amount of deviation of position from the design data is obtained; and a third step in which welding is performed along said welding line on the basis of said modified teaching data, is provided.

As the amount of deviation of welding position from the design data at each welding point is determined from the image obtained by photographing the welding point according to the teaching data consisting of the three-dimensional position and the normal vector at the three-dimensional position, then the modified teaching data is obtained by correcting the teaching data on the basis of the amount of deviation of position from the design data, and after this the welding is performed along the welding line, the accuracy of the welding is high when forming a three-dimensional structure.

It is suitable that supplemented teaching data, which is the teaching data consisting of said modified teaching data and welding condition in accordance with the amount of deviation of position from the design data, is used in said second step, and the welding is performed according to said supplemented teaching data instead of said modified teaching data in said third step.

By establishing the supplemented teaching data by adding the welding condition, which depends on the amount of deviation of welding position from the design data, to the modified teaching data, and performing the welding according to the supplemented teaching data, the welding condition at each welding point is determined according to said amount of deviation of position from the design data at each welding point, resulting in more accurate welding.

It is suitable that said amount of deviation of position from the design data is determined, for example, by light section method in said first step. It is also suitable that the amount of deviation of position from the design data in a vertical direction, gap width, and amount of deviation from the welding line of the design data in the direction crossing perpendicular to the welding line crossing in the direction tangential to the surface of the member to be welded (hereafter referred to as the amount of deviation from the designated seam line) at each welding point are determined by light section method as the first deviation, the amount of deviation of position from the design data in a horizontal direction is determined by shading method as the second deviation, and said first and second deviation are used as said amount of deviation of position from the design data.

By determining the amount of deviation of welding position from the design data in a vertical direction, gap width, and amount of deviation from the designated seam line at each welding point as the first deviation, the amount of deviation of position from the design data in a horizontal direction by shading method as the second deviation, and modifying the teaching data according to the first and second deviations, the correction of the deviation of welding point can be executed accurately.

It is suitable that said welding points are photographed to obtain welding images during welding and said modified teaching data is further modified according to the welding images in the third step.

By this, as the amount of deviation of welding position from the design data is corrected during welding, more accurate welding is possible.

Further, according to the present invention, an apparatus for welding a three-dimensional structure used when forming the three-dimensional structure by combining and connecting a plurality of members by welding along welding lines, wherein the apparatus is provided with a memory means in which are provided teaching data consisting of three-dimensional of said welding lines at a predetermined spacing on the basis of the design data of said three-dimensional structure and the normal vectors at the points, a photographing means which is controlled according to the teaching data to photograph said welding points in order to obtain the image data thereof, an image processing means which determines the amount of deviation of position from the design data at each of said welding points by processing said image data, and a control means which establishes modified teaching data by modifying said teaching data according to said amount of deviation of position from the design data; and said control means controls a welding head to move and weld along said welding line according to said modified teaching data, is provided.

By using the apparatus like this, the welding to form a three-dimensional structure can be carried out with good accuracy, matching to the three-dimensional shape.

Further, it is suitable that the welding condition depending on said amount of deviation of position from the design data is stored in said memory means, said control means allows the welding condition depending on said amount of deviation of position from the design data to be added to said modified teaching data to obtain supplemented teaching data, controls the movement of said welding head according to said supplemented teaching data instead of said modified teaching data, and also controls the output of said welding head and the supply of welding wire.

By welding according to the supplemented teaching data, the welding condition is determined depending on the amount of deviation of welding position from the design data at each welding point, so that welding can be performed more accurately.

Said photographing means has a light emitting section for emitting laser slit light and a CCD camera for receiving the laser slit light so that said image data is obtained by light section method.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

The present invention will now be explained hereunder, taking the tail tube of a gas turbine combustor as an example of a three-dimensional structure, about the manufacturing of the tail tube of gas turbine from a plurality of three-dimensional members by welding. However, the present invention can be applied similarly to other three-dimensional structures to be manufactured by welding together a plurality of three-dimensional members.

Figure 1:
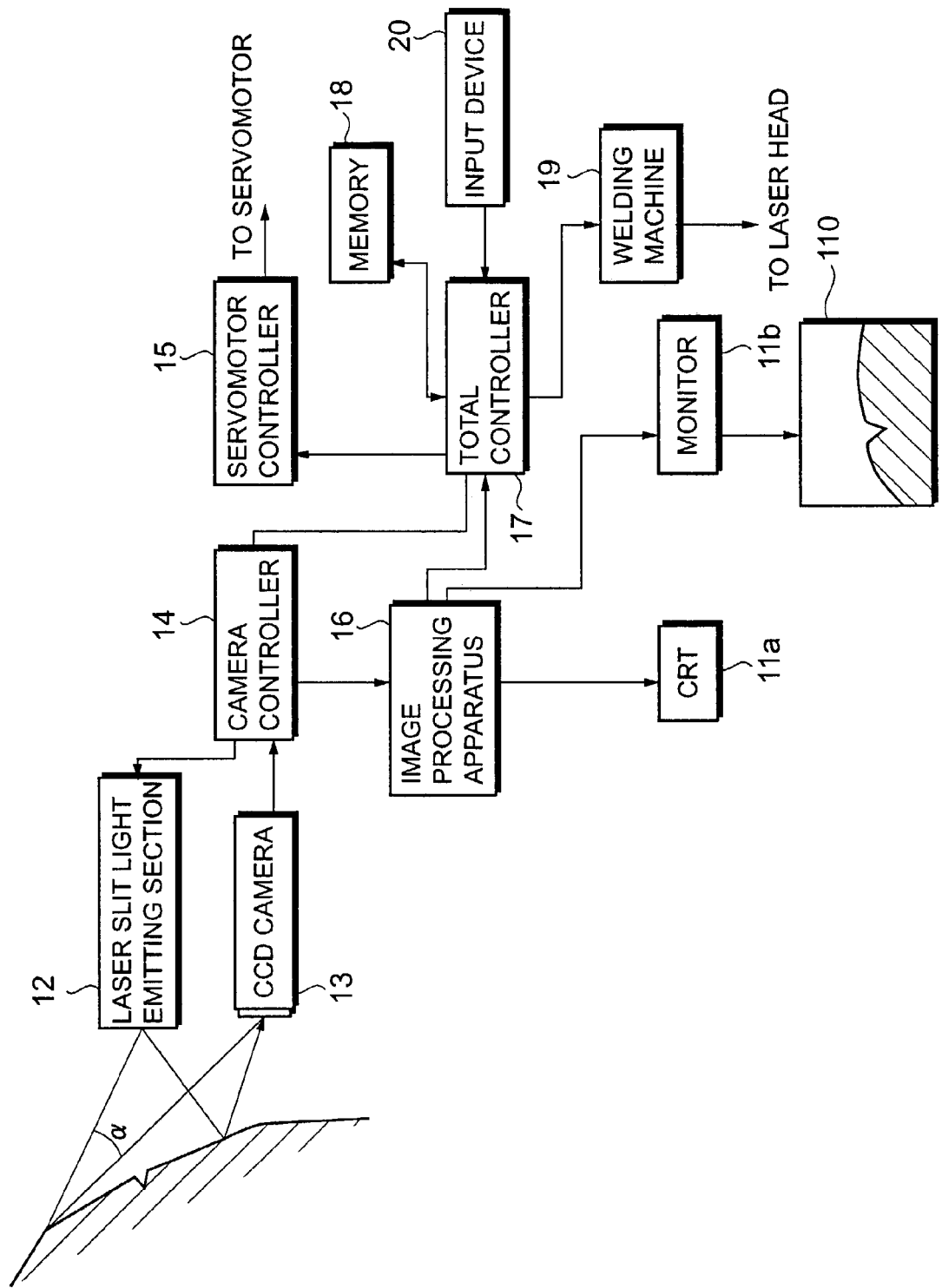
FIG. 1 is a block diagram showing an example of the apparatus for welding a three-dimensional structure according to the present invention.

Referring to FIG. 1, the apparatus for welding a three-dimensional structure is provided with a display(CRT) 11a, a monitor 11b, a laser slit light emitting section 12, a CCD camera 13, a camera controller 14, a servomotor controller 15, an image processing apparatus 16, total controller 17, a memory 18, a welding machine 19, and an input device 20.

A unit composed of said laser slit light emitting section 12 and CCD camera 13 is hereafter referred to as a laser slit light sensor.

In the example shown in the drawing, said welding machine 19 is, for example, a laser beam welding machine using YAG laser. Welding is performed by the laser light emitted from a laser head which is a welding torch head.

Figure 2:
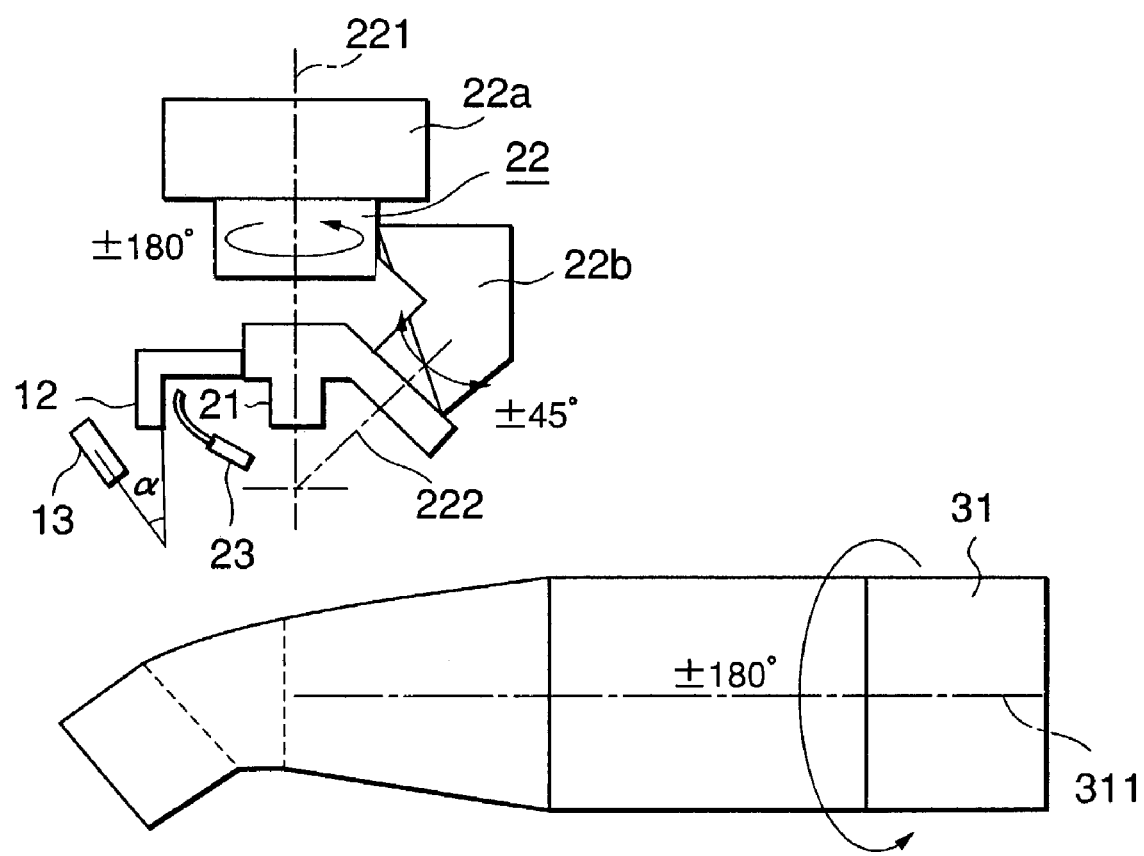
FIG. 2 is a schematic representation showing an example of the drive mechanism and photographing apparatus of the apparatus for welding a three-dimensional structure according to the present invention.

Here, referring to FIG. 2, the laser head 21 is attached to a supporter 22 and controlled by the total controller 17 via the servomotor controller 15 to move in three directions x, y, z including weaving movement. To be more specific, the supporter 22 has a supporting part 22a and an arm 22b attached to the supporting part 22a for rotation. The supporting part 22a is rotatable around the axis 221 indicated by a dashed dotted line in a clockwise and counterclockwise direction by 180°. The arm 22b is rotatable around the axis 222 indicated by a dashed dotted line in a clockwise and counterclockwise direction by 45°.

A wire supply head 23 is located near the laser head 21. When welding is performed, welding wire is supplied to welding position from the wire supply head 23. The laser slit light emitting section 12 emits a laser slit light onto the welding position(line to be welded(welding groove line)) so that the laser slit line crosses the welding groove line.

The CCD camera 13 receives the laser slit light from the direction inclined by a determined angle α with regard to the emitting direction of the laser slit light to grasp the section of the welding groove by light section method. The received light is given to the camera controller 14. The laser slit light emitting section 12 and CCD camera 13 are attached to the supporter 22 as a unit. The apparatus for welding a three-dimensional structure is provided with a height sensor(not shown in the drawings), which controls the position(height) of the laser slit light emitting section 12 and CCD camera 13 from the welding groove.

In said memory 18 are stored a variety of design drawings (three-dimension design data) of three-dimensional structures(tail tubes of combustors are meant here). These three-dimensional data include the design data of a plurality of members(three-dimensional member) and the design data of tail tubes which are composed of a plurality of members butted or connected together. Further, the lines formed when a plurality of the members are butted are included as welding line data in said three-dimensional data. Each welding line data is established as a set consisting of the vector representing three-dimensional position(coordinates) and a normal vector at the position. For example, a point on a welding line is defined as P1(x,y,z,i,j,k). (x,y,z) is a point on the welding line expressed in x-y-z coordinates, and (i, j. k) expresses the normal vector at said point to the surface which includes the welding line. The above-mentioned welding line data is the teaching data.

Figure 3:
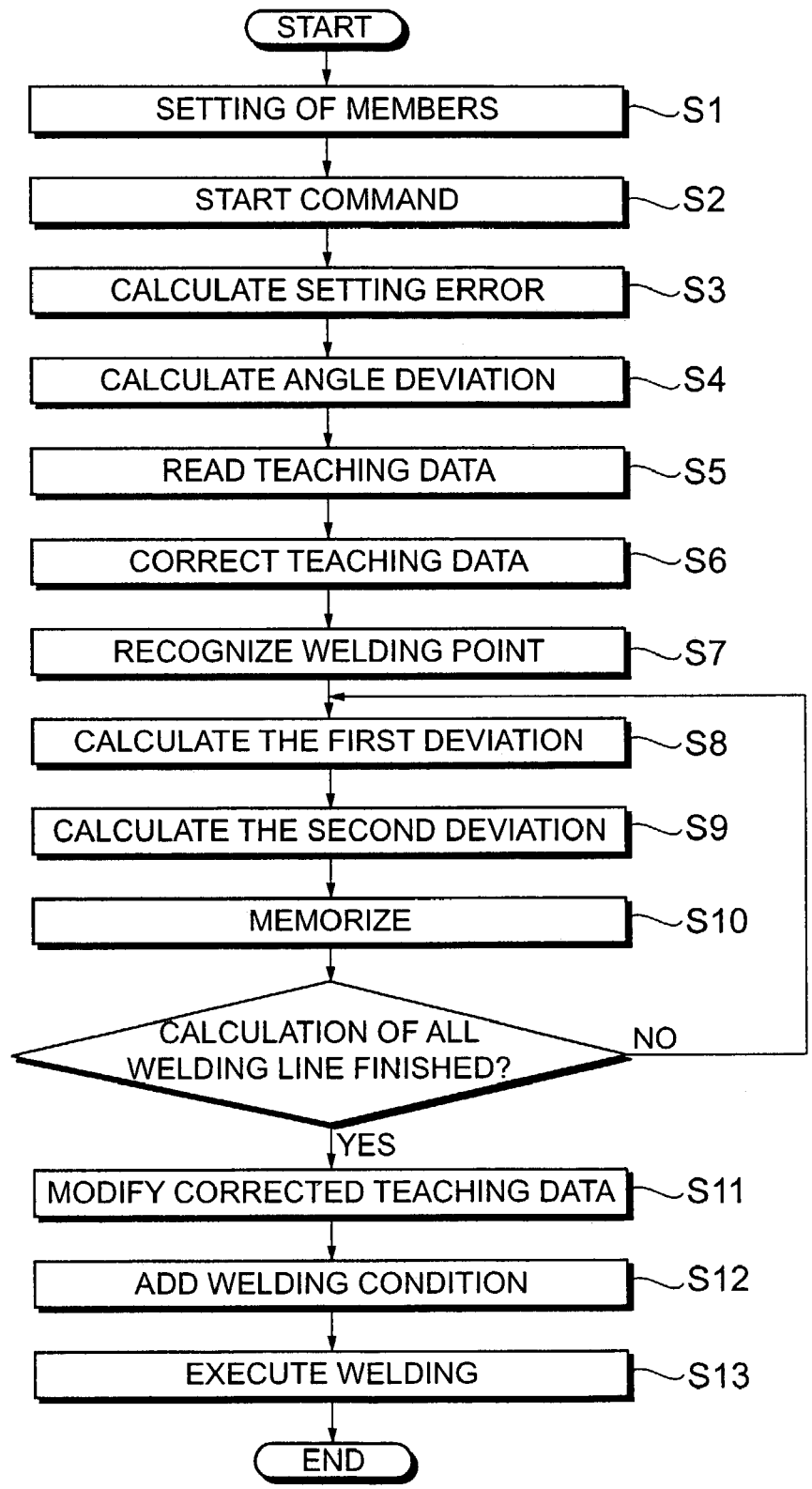
FIG. 3 is a flowchart for explaining the operation of the apparatus for welding the three-dimensional structure shown in FIG. 1.
Figure 4:
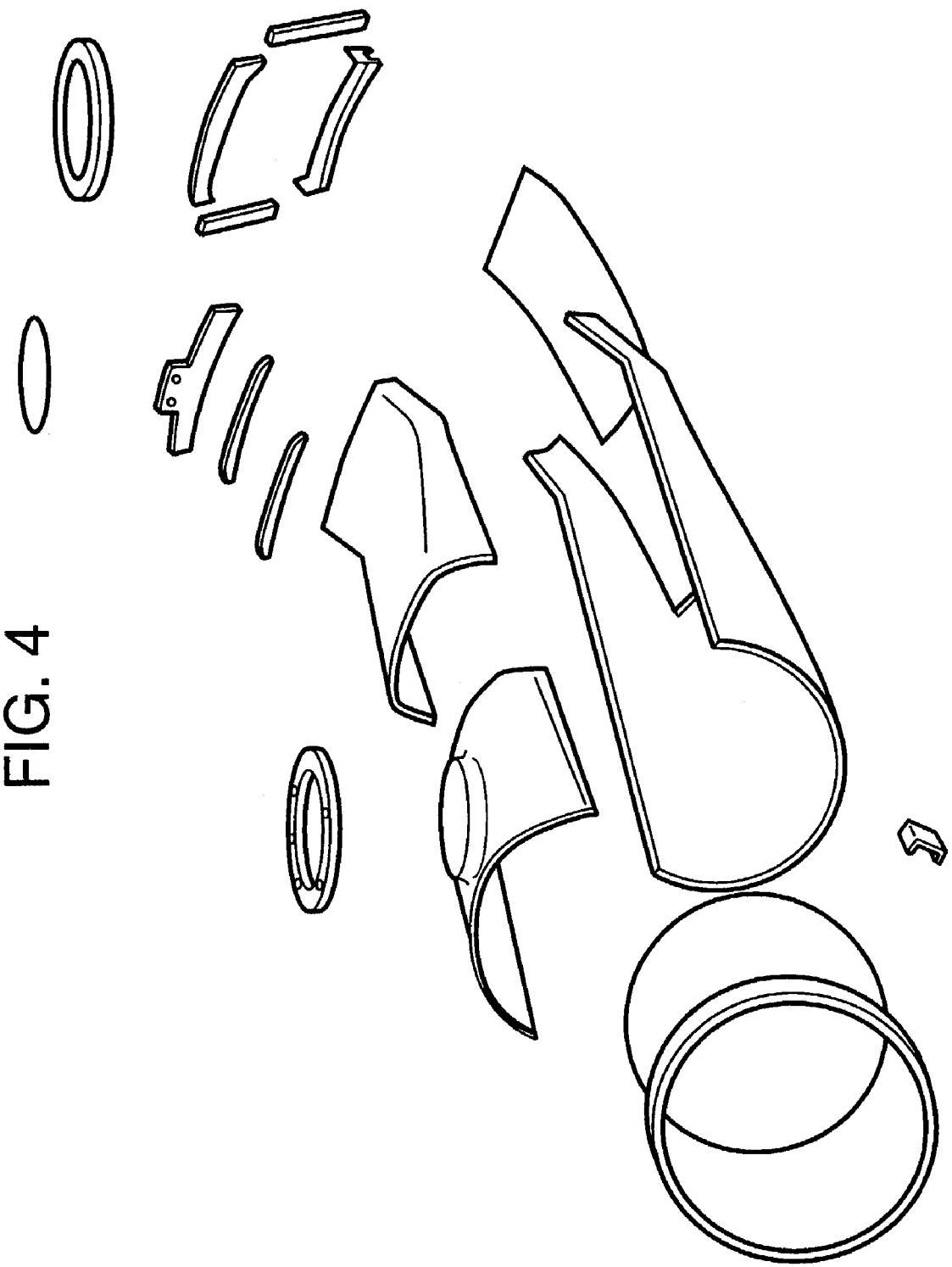
FIG. 4 is a perspective illustration of the dismantled members of an example of a three-dimensional structure.
Figure 5:
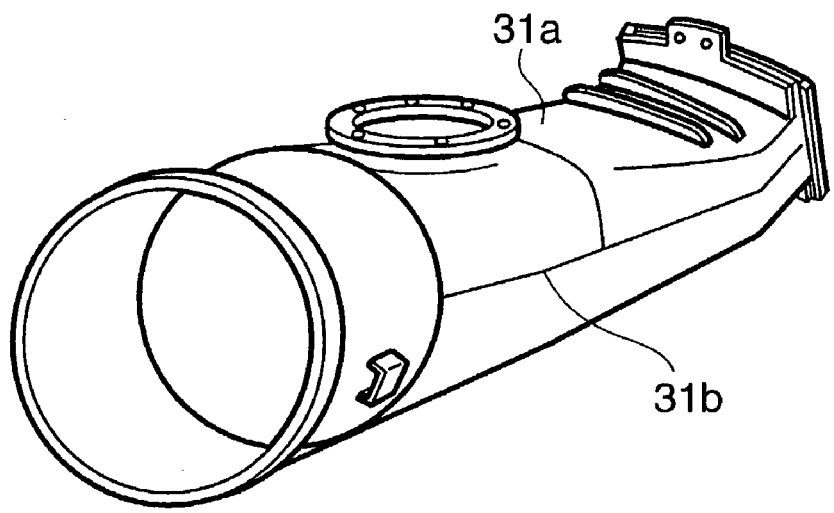
FIG. 5 is a perspective illustration of an example of a three-dimensional structure in assembled state.

Referring to FIG. 1, FIG. 2, and FIG. 3, first, each of the members for composing a combustor tail tube 31 are set to a chuck(not shown in the drawings)(step S1). Each member may deviates more or less from the design drawing when plastically deformed in the manufacturing process. For example, each of the members shown in FIG. 4 is set to a chuck to form the tail tube assembly 31a. A line 31b is seen as a line to be welded on the tail tube assembly 31a. Each of the members is set at the predetermined set position, however, there may inevitably occur deviation.

After each member is set to the chuck, weld start command is given from the input device 20(step S2). The signal for selecting a combustor tail tube is included in the weld start command. The total controller 17 recognizes deviation from the predetermined set position in side-to-side and up-and-down directions at a part (for example, at an end part) of the assembly 31a. For recognizing said deviation, the image data is obtained by shading method from the image photographed by the CCD camera 13 and taken into the image processing apparatus 16. The image data is displayed, for example, on the monitor 11b as an image.

The total controller 17 is provided with predetermined set position data and determines setting errors, based on the set position data and the image data (step S3). Then, the total controller 17 calculates the deviation angle of the direction of the rotation axis of the assembly 31a(as shown in FIG. 2, the combustor tail tube 31(assembly 31a) can be rotated around the rotation axis 311 indicated by a dotted dashed line in a clockwise and counterclockwise by 180°)(step S4). The deviation angle is displayed, for example, on the CRT 11a.

Then, the total controller 17 reads the appropriate teaching data from the memory 18 according to the signal for selecting a combustor tail tube(step S5) and corrects it on the basis of said deviation angle to obtain corrected teaching data(S6). The total controller 17 controls the laser slit light sensor via the camera controller 14 according to the corrected teaching data and the servomotor(not shown in the drawings) via the servomotor controller 15 to move the supporter 22 in the direction of x, y, and z axes and to rotate the assembly 31a around its rotation axis. By this operation, each welding line 31b of the assembly 31a is recognized at a predetermined spacing according to the teaching data(x, y,z,i,j,k)(step S7). The image processing apparatus 16 allows the image 110 obtained from the laser slit light sensor(i.e. CCD camera 13) to be displayed on the monitor 11b.

After all the welding lines are recognized, the total controller 17 allows the laser slit light emitting section 12 to be positioned so that the laser slit light irradiate the groove of the welding line 31b in a state it crosses the welding line and the CCD camera 13 to be positioned so that it receives the laser slit light from the direction slanting by a determined angle with regard to the emitting direction of the laser slit light(as mentioned before, the laser slit light sensor is controlled via the camera controller 14 according to the corrected data and the servomotor is controlled via the servomotor controller 15 to move the supporter 22 in the directions of x, y, z axes and rotate the assembly 31a around its axis of rotation).

Then, the camera controller 14 allows the laser slit light emitting section 12 to emit the laser slit light, which is received by the CCD camera 13, in other words, the welding line is photographed by light section method. The width, amount of deviation of position from the design data(up-and-down direction), and amount of deviation from the designated seam line at each welding point are determined from the image obtained from the CCD camera 13, and these data is established as the first deviation(step 8). Further, the photographing by CCD camera 13 at each welding point along the welding line 31b is performed, the amount of deviation of position from the design data(in side-to-side direction) at each welding point is determined by shading method, and these data is established as the second deviation (step 9).

After the first and second deviation at each welding point concerning a welding line 31b are determined, the total controller 17 allows the first and second deviation at each welding point to be memorized in the memory 18(step 10). When the first and second deviation of all of the welding line 31b are memorized, the total controller 17 shifts to the control of welding operation.

By the way, the welding condition(electric current, voltage, moving speed of the supporter 22, weaving width, weaving speed, and welding wire supply speed, etc.) depending on the width(of the gap) and amount of deviation from the designated seam line specified by said teaching data for each welding point(position to be welded) is memorized in the memory 18, and the total controller 17 modifies the corrected teaching data by the first and second deviation at each welding point to establish modified teaching data (step S11). Then, the total controller 17 reads out the welding condition which depends on the gap and amount of deviation from the designated seam line for each welding line from the memory 18 and adds the welding condition to the modified teaching data(which is hereafter referred to as supplemented teaching data)(step S12).

The total controller 17 allows the servomotor to move the laser head 21 via the servomotor controller 15 and the welding machine 19 according to the supplemented teaching data, and it also allows the welding head 21 to emit laser light. The welding wire is supplied from the wire supply head 23. In other words, the welding head 21 is moved to each welding point according to the supplemented teaching data and welding is performed by controlling the welding machine 19 and the supply of wire depending on the welding condition included in the supplemented teaching data(step S13).

Figure 6:
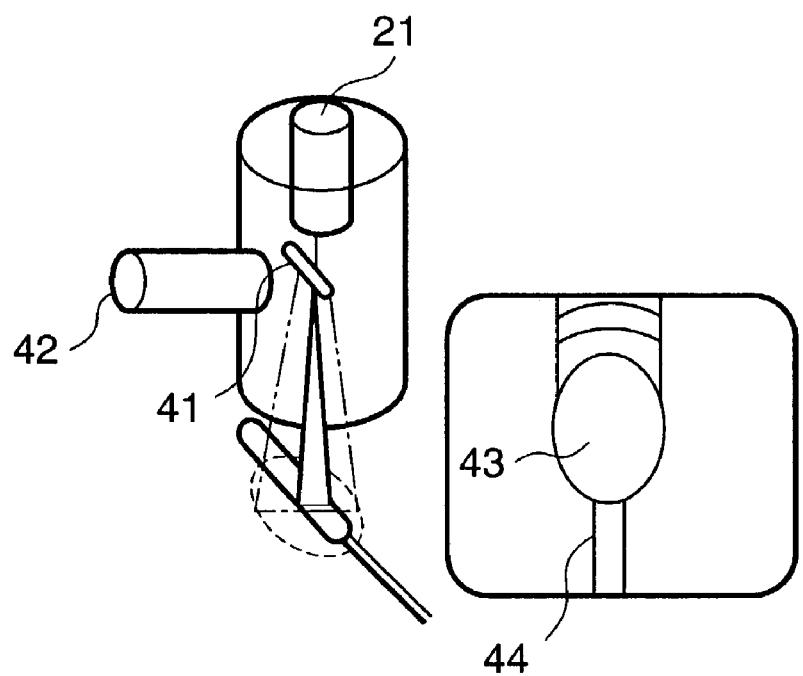
FIG. 6 is a drawing for explaining the method of sensing the state in welding of the three-dimensional structure shown in FIG. 1.

The correction of the deviation of welding position may be executed by image sensing during the welding as shown in FIG. 6. To be more specific, a half mirror 41 is provided to the output end side of the laser head 21, laser light is emitted from the laser head 21 onto the welding point via the half mirror 41. The image of a welding point is input to a CCD camera 42 via the half mirror 41. Thus, the image signal including a molten pool 43 and welding groove line 44 is given from the CCD camera 42 to the image processing apparatus 16, which allows the image signal to be displayed on the monitor 11b. The operator observes the displayed welding image and corrects the position of the laser head 21. The CCD camera 42 moves in synchronism with the laser head 21

As has been described, the position of the welding point to be welded on the welding line is photographed by light section method according to the teaching data determined by the three-dimensional position and its normal vector to measure the shape of the welding line, and then the welding condition is modified and set according to the result of the measurement. Therefore, the welding in manufacturing a three-dimensional structure can be carried out with good accuracy. That is to say, even if the component members of the three-dimensional structure deviate in some degree from their drawings, the welding can be performed, matching to the shape of the component members and welding grooves, with good accuracy.

As has been described in the forgoing, according to the present invention, the amount of deviation of welding position from the design data is determined from the image obtained by photographing at each welding point along each welding line at a predetermined spacing according to the teaching data consisting of the three-dimensional position and the normal vector at each point determined on the basis of the design data of the three-dimensional structure, a modified teaching data is obtained by modifying the teaching data by the amount of deviation of welding point from the design data, and then the welding is carried out along the welding line according to the modified teaching data, so that the welding in manufacturing a three-dimensional structure can be performed with good accuracy matching to the three-dimensional shape.

Further, by welding according to the supplemented teaching data which include the welding condition in accordance with the amount of deviation of welding position from the design data, the welding is done at each welding point under the condition determined according to the amount of deviation of position from the design data at each welding position. As a result, the welding accuracy can be further improved.

By obtaining as the first deviation the amount of deviation of welding line from the design data in the vertical direction at each welding point, gap width, and amount of deviation from the designated seam line by light section method and as the second deviation the deviation of the welding line in the horizontal direction at each welding point by shading method, and modifying the teaching data on the basis of the first and second deviation, the deviation of welding point can be corrected with good accuracy.

In addition, by obtaining the welding image at welding points during welding and further modifying said modified teaching data according to the welding image, the deviation of welding position can be modified during welding, resulting in more accurate welding.

What is claimed:

1. A method of welding a three-dimensional structure including a cylindrical portion, the method used when forming the three-dimensional structure by combining and connecting a plurality of members by welding along welding lines, the method comprising:

determining in a first step, three-dimensional positions of welding points on at least one of said welding lines at a predetermined spacing on the basis of design data of said three-dimensional structure;

determining an amount of deviation of position from the design data at the welding points from an image obtained by photographing the at least one welding line at the welding points by moving a light emitting section in a direction of x, y, and z axes and rotating work around its rotation axis so that the laser slit light irradiates the groove of the welding line when it crosses the welding line, and a CCD camera being positioned so that it receives the laser slight light from the direction slanting by a determined angle with regard to the emitting direction of the laser slight light;

determining the amount of deviation of position from the design data in a vertical direction, gap width and amount of deviation from a designated seam line at the welding points from an image obtained from a CCD camera by light section method as a first deviation; and determining the amount of deviation of position from the design data in a horizontal direction by shading method from said obtained image, said obtained image being processed as a second deviation, a second step in which the teaching data corrected by said amount of deviation of position from the design data is obtained as modified teaching data; and a third step in which welding is performed along said at least one welding line in accordance with said modified teaching data.

2. The method of welding a three-dimensional structure according to claim 1, wherein said welding points are photographed to obtain welding images during welding, and said modified teaching data is further modified according to the welding images in said third step.

3. The method of welding a three-dimensional structure according to claim 1,
wherein the welding condition depending on the gap width and amount of deviation from the designated seam line specified by said teaching data for each welding point, is stored in a memory,
and the second step comprises the steps of:
modifying the corrected teaching data by the first and second deviation at each welding point to establish modified teaching data;
reading out the welding condition which depends on the gap and amount of deviation from the designated seam line for each welding line from the memory;
adding the welding condition to the modified teaching data.

4. An apparatus for welding a three-dimensional structure including a cylindrical portion formed from a plurality of members by welding along welding lines, comprising:
a memory means for storing teaching data comprising three-dimensional positions of welding points determined on at least one of said welding lines at a predetermined spacing based on design data of said three-dimensional structure and as well as for storing normal vectors at the welding points,
a photographing means for photographing said welding points in order to obtain image data thereof according to said teaching data,
an image processing means for determining an amount of deviation of position from the design data at said welding points by moving a light emitting section in a direction of x, y, and z axes and rotating work around its rotation axis so that the laser slit light irradiates the groove of the welding line when it crosses the welding line, and a CCD camera being positioned so that it receives the laser slight light from the direction slanting by a determined angle with regard to the emitting direction of the laser slight light, determining the amount of deviation of position from the design data in a vertical direction, gap width and amount of deviation from a designated seam line at the welding points from an image obtained from a CCD camera by light section method as a first deviation, determining the amount of deviation of position from the design data in a horizontal direction by shading method from said obtained image, said obtained image being processed as a second deviation, and processing said image data, and
a control means for determining modified teaching data by modifying said teaching data according to said amount of deviation of position from the design data, said control means controlling a welding head so that the welding head moves and welds along said at least one welding line in accordance with said modified teaching data.

5. The apparatus for welding a three-dimensional structure according to claim 4, wherein a welding condition depending on said amount of deviation of position from the design data is stored in said memory means, and said control means is configured to permit the welding condition depending on said amount of deviation of position from the design data to be added to said modified teaching data to obtain supplemented teaching data, to control the movement of said welding head according to said supplemented teaching data, and to control output of said welding head and a supply of welding wire.

6. The apparatus for welding a three-dimensional structure according to claim 4, wherein said photographing means comprises a light emitting section configured to emit laser slit light and a CCD camera configured to receive the laser slit light.

* * * * *